United States Patent [19]

Lott

[11] Patent Number: 4,871,454

[45] Date of Patent: Oct. 3, 1989

[54] PORTABLE DUMPSTER SLURRY SEPARATING SYSTEM

[76] Inventor: W. Gerald Lott, 1857 Post Oak Park Dr., Houston, Tex. 77027

[21] Appl. No.: 211,836

[22] Filed: Jun. 27, 1988

[51] Int. Cl.[4] .............................................. B01D 29/16
[52] U.S. Cl. .................................... 210/205; 210/202; 210/237; 210/241; 210/295; 210/407; 210/416.1; 210/455; 210/477; 210/484
[58] Field of Search .............. 210/702, 710, 767, 768, 210/787, 806, 791, 202, 205, 225, 237, 241, 244, 258, 295, 315, 407, 416.1, 455, 477, 484, 499

[56] References Cited

U.S. PATENT DOCUMENTS

| | | | |
|---|---|---|---|
| 271,239 | 1/1883 | Hobbs | 210/407 |
| 392,607 | 11/1888 | Heywood | 210/241 |
| 644,124 | 2/1900 | Bradley | 210/225 |
| 658,639 | 9/1900 | Guion | 210/237 |
| 798,200 | 8/1905 | Merrill | 210/225 |
| 1,311,639 | 7/1919 | Cartwright | 210/499 |
| 1,968,114 | 7/1934 | Windecker | 210/710 |
| 2,061,119 | 11/1936 | Voigt | 210/455 |
| 2,376,874 | 5/1945 | Henry | 210/244 |
| 2,458,139 | 1/1949 | Boucher | 210/499 |
| 2,477,404 | 7/1949 | Butt, Jr. | 210/241 |
| 2,775,550 | 12/1956 | Harlow | 210/499 |
| 2,913,118 | 11/1959 | Coleman et al. | 210/315 |
| 3,322,282 | 5/1967 | Lyman | 210/315 |
| 3,335,865 | 8/1967 | Cawley et al. | 210/260 |
| 3,970,552 | 7/1976 | Bongert | 210/791 |
| 4,133,769 | 1/1979 | Morgan, Jr. | 210/455 |
| 4,189,386 | 2/1980 | Aman | 210/235 |
| 4,306,967 | 12/1981 | Trautwein | 210/167 |
| 4,425,228 | 1/1984 | Lynn et al. | 210/787 |
| 4,571,296 | 2/1986 | Lott | 209/211 |
| 4,634,535 | 1/1987 | Lott | 210/780 |
| 4,655,916 | 4/1987 | Schlesiger | 210/173 |

FOREIGN PATENT DOCUMENTS

| | | |
|---|---|---|
| 3231186 | 4/1983 | Fed. Rep. of Germany . |
| 3526863 | 1/1987 | Fed. Rep. of Germany . |
| 3604616 | 8/1987 | Fed. Rep. of Germany . |
| 16673 | 12/1927 | Netherlands . |
| 172649 | 2/1986 | PCT Int'l Appl. . |

OTHER PUBLICATIONS

Translation of German Patent No. 3,604,616.
Solid Waste Management 1983, Sanitation Industry Yearbook, pp. 218, 221, 222, 228, 242.

Primary Examiner—Peter Hruskoci
Assistant Examiner—Christopher Upton
Attorney, Agent, or Firm—J. Peppers

[57] ABSTRACT

Discloses apparatus for separating the solids from a liquid of a sludge or slurry which includes a slurry source, a slurry container receiving slurry from the source and a filter cage removably mounted inside the container. The filter cage includes a cage frame, a supported screen liner mounted within the cage and a filter liner removably fitted inside the liner. The container has a liquid drainage conduit removably connected to a suction device for removing liquid from the drainage chamber. The container is constructed and adapted to be picked up, carried about, and tilted to remove solid material deposited within the filter cage. The filter cage is constructed and adapted to be hoisted up out of the container and separately moved about and tilted to remove solids deposited within the filter cage. A liquid injection apparatus may be provided for injecting a selected amount of a flocculating agent into the slurry received into the container to cause flocculation of solid particles in the slurry. Also discloses the steps of the method of extracting liquid from a slurry and disposing the remaining solids.

6 Claims, 2 Drawing Sheets

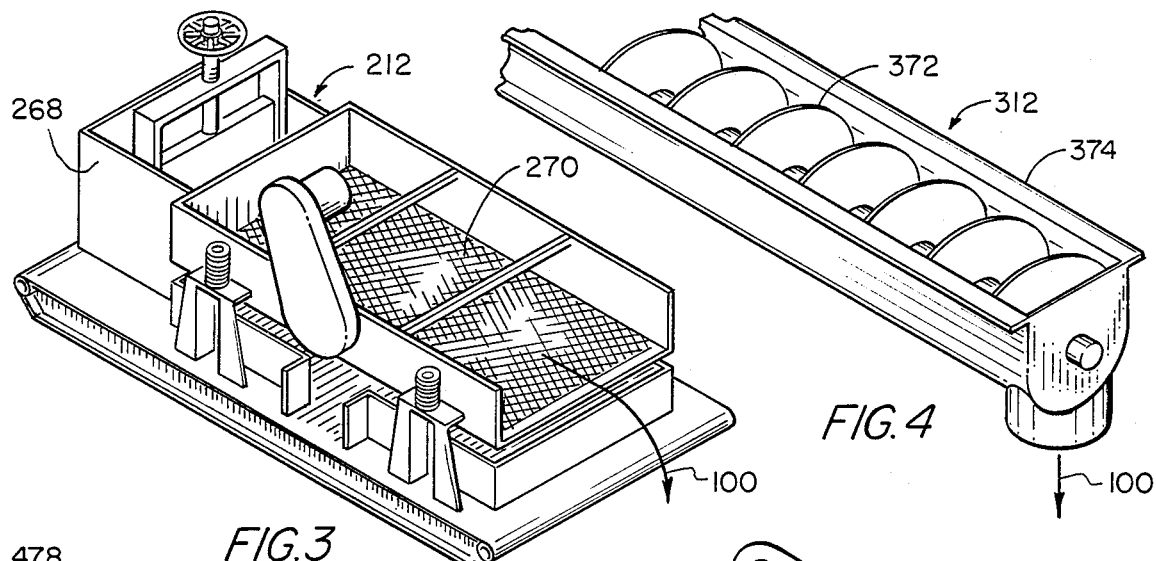
FIG.3
FIG.4
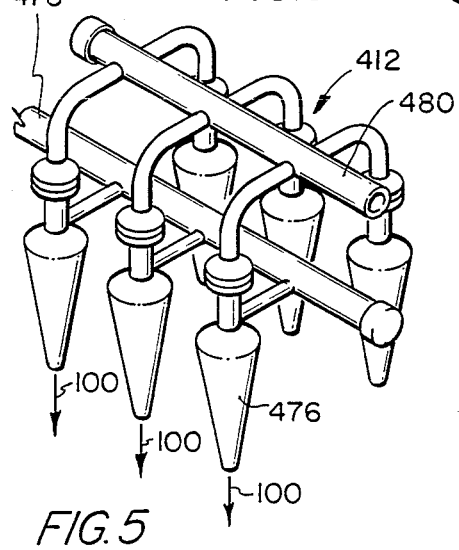
FIG.5
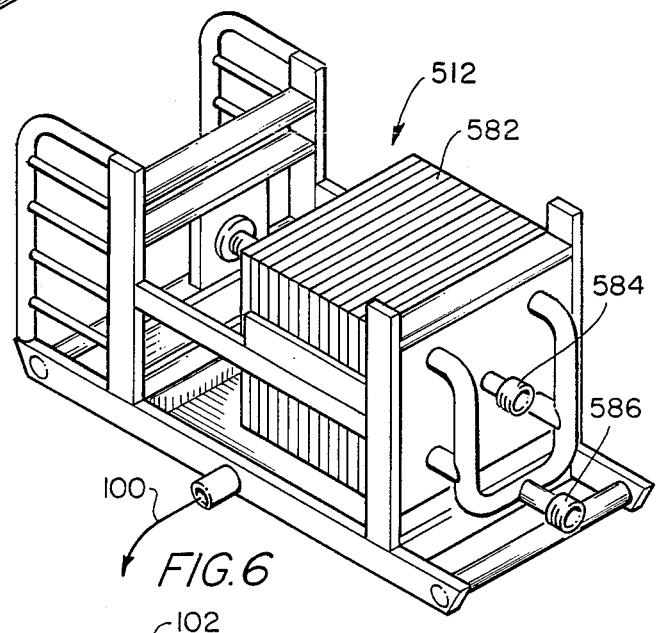
FIG.6
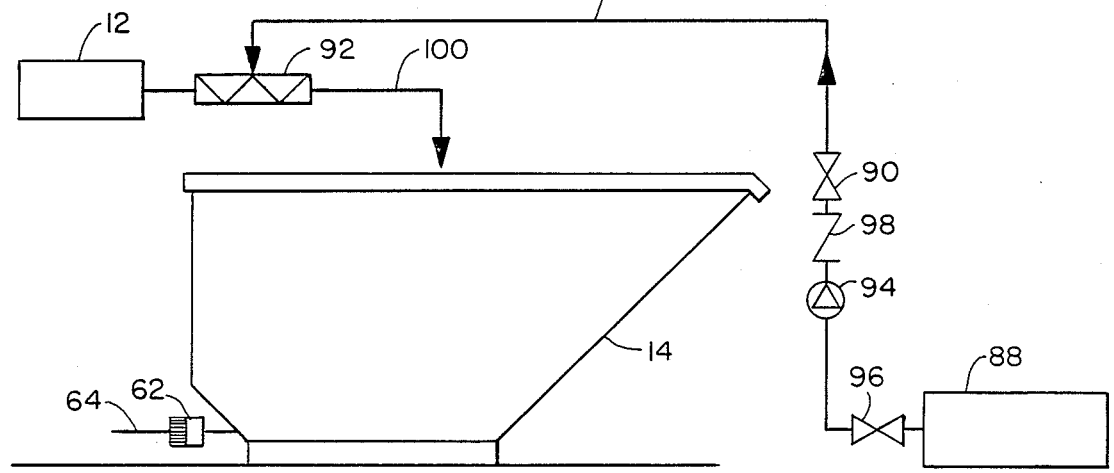
FIG.7

PORTABLE DUMPSTER SLURRY SEPARATING SYSTEM

FIELD OF THE INVENTION

This invention generally relates to separating sludges, slurries and the like into their respective liquid and solids components. More particularly, the invention pertains to a method and apparatus for extracting a liquid from a sludge or slurry and disposing of the discrete bits of the remaining solids. The invention is specifically provided to (a) separate and recover a liquid from a sludge or slurry, (b) separate and recover the solids from a slurry, and (c) separate both liquid and solids from a slurry to be disposed of.

BACKGROUND OF THE INVENTION

There are presently many kinds of apparatus utilized to separate liquids from particulate solids which are being carried by the liquids. For example, drilling slurries are made up of water and finely divided clay which carry cuttings removed from a well bore during drilling of the well. Apparatus and methods for removing such cuttings are disclosed in U.S. Pat. No. to Lott 4,571,296 and Lott No. 4,634,535. Apparatus for disposing debris from water is disclosed from Aman U.S. Pat. No. 4,189,386. Apparatus for filtering sludge from sewage is disclosed in Cawley et al U.S. Pat. No. 3,335,865. Apparatus for screening aircraft fuel is disclosed in Henry U.S. Pat. No. 2,376,874. Apparatus for separating the water from mining sludge and conveying the sludge from the mine is disclosed in Schlesiger U.S. Pat. No. 4,655,916. The above constitute the presently known prior art. As will later become evident, many of the slurry sources used with the apparatus of this invention also remove liquid from the slurry. Thus, the slurry received into the present apparatus sometimes may have less liquid to extract.

Portable dumpster hopper vessels, such as employed in this invention, are commercially available and may be purchased and modified or altered as needed. Other portable vessels which need to conform to certain industry or government standards may be especially constructed to meet such standards and also function as needed for this invention. An example is U.S. Coast Guard Standards for offshore installations.

Commercial dumpster hopper vessels are available from Galbreath, Inc., Winamac, Ind. 46996 and Roura Iron Works, 1401 Woodland Avenue, Detroit, Mich. 48211. Also, peristaltic pumps such as disclosed herein are commercially available with one exemplary model being the "Master Pump" sold by National Master Pump, Inc., Houston, Tex. 77206-0269.

Comprehensive information concerning solid-liquid separation of the different kinds is available in the book by Svarovsky, Ladislav, "Solid-Liquid Separation", Butterworths, London, 1977, and in "Process Design Manual for Suspended Solids Removal", U.S. Environmental Protection Agency Technology Transfer, E.P.A. 625/1-75-003a, Washington, D.C., January 1975.

The patents to Lott U.S. Pat. No. 4,571,296 and No. 4,634,535 Lott are specifically incorporated herein by reference.

OBJECTS OF THE INVENTION

One object of the invention is to provide a portable dumpster hopper vessel which may be placed to receive a slurry from a slurry source, removed to a slurry dumping site, conveniently tilted to be emptied, and returned into position to receive more slurry.

Another object of the invention is to provide a removable unitized screening element having a frame or cage that fits inside the walls of the dumpster vessel and is capable of respective removal and dumping at the dumping site.

Another object of the present invention is to provide a liquid separation system that receives liquid filtered from the slurry passed into said dumpster vessel and removes the liquid for disposal elsewhere.

Another object of the present invention is to provide a vacuum system connected for quick release to remove the liquids to the dumpster vessel.

Yet another object of the invention is to provide a flocculating system for mixing flocculent with the slurry and thereby flocculating the slurry into more filterable condition.

SUMMARY OF THE INVENTION

The foregoing and other objects and advantages of the invention are provided with apparatus for separating the solids from a liquid of a sludge or slurry which includes a slurry source, a slurry dumpster hopper vessel or container receiving slurry from the source and a filter cage removably mounted inside the container. The filter cage includes a cage frame, a supported screen liner mounted within the cage and a filter liner or media removably fitted inside the liner. The cage in the container defines a drainage chamber disposed adjacent the screen liner and within the sides and bottom of the container. The container has a liquid drainage conduit removably connected to a suction device for removing liquid from the drainage chamber. The container is constructed and adapted to be picked up, carried about, and tilted to remove solid material deposited within the filter cage. The filter cage is constructed and adapted to be hoisted up out of the container and separately moved about and tilted to remove solids deposited within the filter cage. The liner may be separately lifted out of the filter cage. A flocculating polymer liquid injection apparatus is provided for injecting a selected amount of a flocculating agent into the slurry received into the container to cause flocculation of solid particles in the slurry to be retained by the filter layer. A closable cover may be provided for the container. A removable closed flow conduit may be connected from the slurry source to the container cover. Also discloses the steps of the method of extracting liquid from a slurry and disposing the remaining solids.

BRIEF DESCRIPTION OF THE DRAWING

FIG. 3 is an isometric view schematically showing a conventional "shale shaker" slurry source;

FIG. 4 is an isometric view schematically showing a conventional screw conveyer flight as a slurry source;

FIG. 5 is an isometric view schematically showing a conventional "cyclone" slurry separation battery as a slurry source;

FIG. 6 is an isometric view schematically showing a conventional filter press as a slurry source; and FIG. 7 is an elevational view schematically showing part of the assembly of FIG. 1 with a flocculating injection and mixing apparatus connected to mix a flocculent with the slurry from the slurry source before discharging the same into the hopper vessel.

DESCRIPTION OF THE PREFERRED EMBODIMENTS

The terms slurry and sludge are interchangeably used in describing the apparatus methods of this invention and include, for example, earth formation drilling slurries, machine tool cuttings saturated with coolant, sewage sludges, chemically flocculated sludges industrial waste, mining tails, and related situations where liquid is to be removed from bits and particles. Also the terms bits and particles may be interchangeably used to describe the remaining solids collected with use of the present invention.

Figure 1:
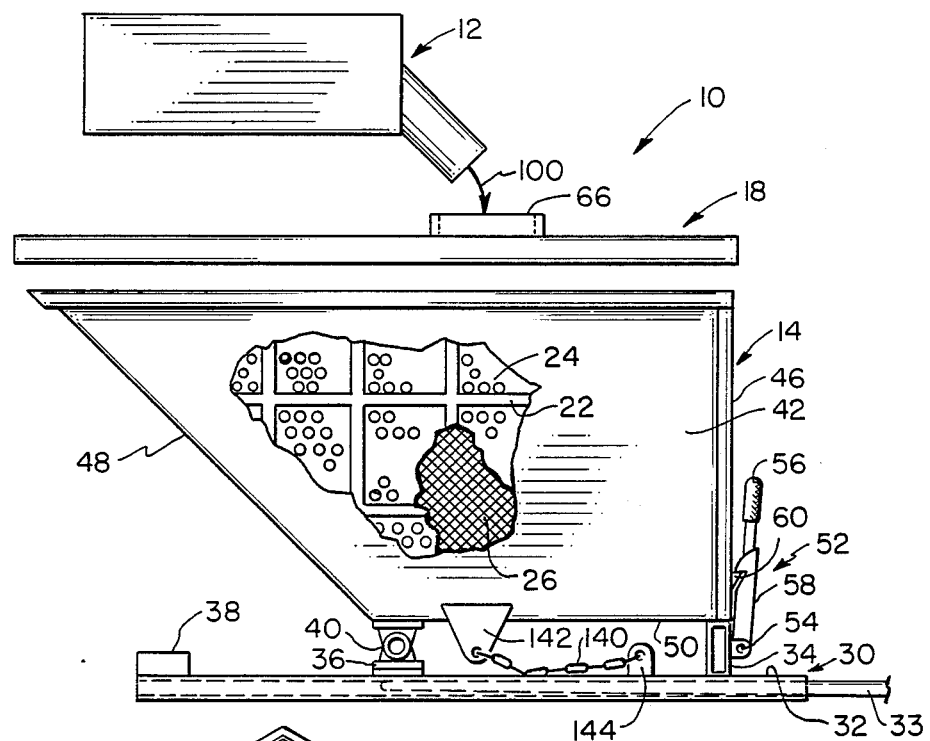
FIG. 1 is a side elevational view schematically showing the invention as receiving a slurry.
Figure 2:
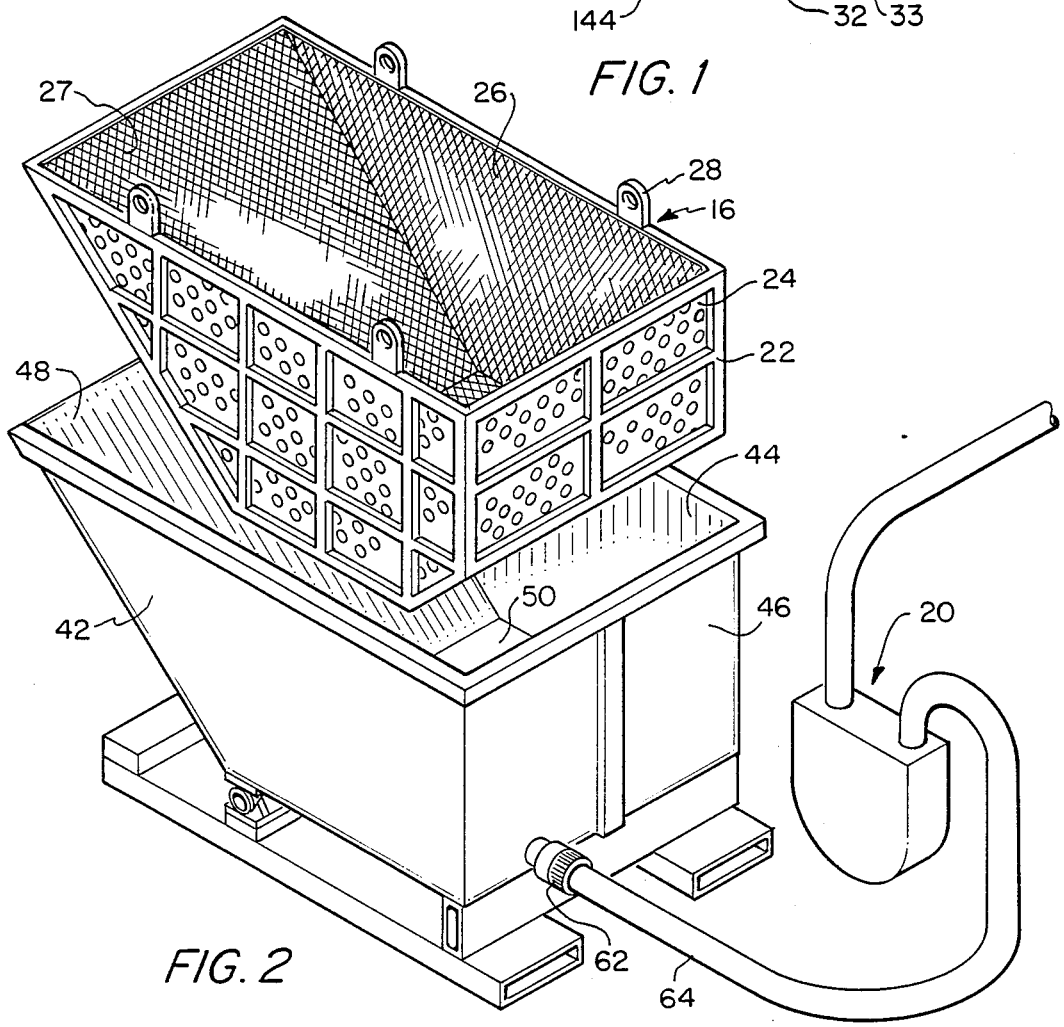
FIG. 2 is an isometric view schematically showing a filter cage as ready for mounting within a hopper vessel and also showing a vacuum pump connected through a conduit into the bottom of the hopper vessel.

Referring jointly to FIGS. 1 and 2, there is schematically illustrated the apparatus 10 including a slurry source 12, a portable dumpster hopper vessel 14, a screen cage receptacle 16, a hopper cover 18, and a vacuum liquid removal pump 20. To give some perspective to the size of the apparatus, exemplary dimensions for the hopper vessel 14 are as follows:

| | |
|---|---|
| 8 feet | top length of the vessel; |
| 4 feet | bottom length of the vessel; |
| 5 feet | length of the base; |
| 4½ feet | width of the vessel assembly; |
| 5 feet | total height of the vessel; |
| 3½ cubic yards | capacity of the vessel. |

It is to be noted that these dimensions are approximate and exemplary.

The screen cage 16 is formed with cage frame members 22 which support a perforated screen 24 to form a rigid structure as shown. The discharge side 27 of the screen cage 16 may be formed of a solid metal sheet to facilitate dumping of the material from the screen 16 when it is tilted.

The perforated screen 24 is lined with a removable or replaceable woven mesh filter media 26 which can be conveniently replaced as when worn or clogged. The screen cage 16 is equipped with four hook lifting eyes 28 by which the cage 16 may be conveniently withdrawn from the hopper vessel 14 and separately tilted to be emptied as desired.

The screen 24 may be of 20 gauge perforated sheet metal with four perforations per inch, for example. The filter media 26 may be of woven mesh made of Teflon, Nylon, Kevlar, stainless steel or other suitable material having the strength and the abrasion and corrosion resistance required for a particular slurry. The woven mesh may be in a range of 1–1000 microns as needed. In certain instances, the filter media may be of a nonwoven filterable material, either natural or synthetic.

The hopper vessel 14 has a base 30 including two hollow base members 32 which form fork drive pockets as shown in FIGS. 1 and 2. Ghosted lines 33 indicate the carrying tines of a typical fork lift transport truck. Connected to base members 32 is a hopper support member 34 and a trunion pivot support member 36. The bottom of vessel 14 rests on the support member 34. The bottom of vessel 14 is connected through a trunion assembly 40 to the trunion support member 36. An end support member 38 may be connected across the ends of the base members 32 for additional structural support. The hopper vessel 14 includes a side 42, a side 44, and end 46 a discharge side 48 and a bottom 50.

As best shown in FIG. 1, vessel 14 is releasably retained on the support member 34 by means of a latch catch assembly 52. The catch assembly 52 includes a latch shaft 54, latch operating handle 56, a catch hook 58 and a catch lug 60 as shown. The latch catch 52 also includes a return spring (not shown). In operation the handle 56 is pulled to pivot the catch 58 about the latch shaft 54 and thereby remove the catch hook 58 from the catch lug 60. The vessel 14 is then permitted to pivot about the trunion 40 to discharge material out of the discharge side 48.

It is to be noted that certain features are shown in FIG. 1, FIG. 2 and FIG. 7 respectively and for clarity these features are shown only in one figure even though the same hopper vessel 14 appears in all three figures.

The slurry source 12 as shown in FIGS. 1 and 7 is intended to be generic with specific embodiments of such a slurry source shown in FIGS. 3–6.

The tilting of the vessel 14 about the trunion 40 is limited by a retainer chain 140 connected between a retainer lug 142 connected to the side of vessel 14 and a retainer lug 144 connected to one of the hopper base members 30.

FIG. 3 shows a conventional shale shaker 212 having a vibrating discharge screen 270 which discharges the separated particulate solids 100 as a slurry while drilling mud is fed into the machine 212 during its operation. Further information concerning such a shale shaker may be seen by referring to the Lott U.S. Pat. No. 4,634,535.

FIG. 4 shows, as a slurry source, a conveyor flight 312 having a screw flight 372 rotating in a trouth 374 to discharge a slurry 100.

FIG. 5 schematically shows a conventional cyclone separator battery 412 as another slurry supply source. As shown the battery includes a slurry intake 478, a plurality of cyclone separators 476, a clean liquid discharge 480 and the slurry 100 from the outlets of the cyclones 476.

FIG. 6 schematically illustrates a conventional filter press 512 which may be used as a slurry source. As shown, there is a slurry intake 584, a clean liquid outlet 586 and an outlet for the slurry 100.

It is to be noted that the slurry discharges of Lott U.S. Pat. Nos. 4,571,296 and 4,634,535 could be among other slurry sources equally as usable as the slurry source 12.

Again referring to FIG. 2, the pump 20 is connected into an appropriate opening in the bottom of vessel 14 through a conventional quick disconnect coupling 62 and a conduit 64. As actually arranged, the pump 20 could be remotely located from the vessel 14 with the conduit 64 and coupling 62 immediately available. When it is desired to move the vessel 14, the coupling 62 is quickly disconnected and when the vessel is returned the coupling 62 is reconnected.

The pump 20 may be of the peristaltic type which pulls a vacuum efficiently and operates effectively with or without liquid being passed through the pump. At times, if the vessel 14 is devoid of liquid, the pump 20 will simply suck air down through the deposited particulates in the cage 16 and tend to dry out the same. This is sometimes advantageous. For example, some solids material can not be disposed of until it passes a "paint filter test" for moisture content as prescribed by the U.S. Environmental Protection Agency.

In FIG. 1, there is shown a cover 18 equipped with a filling hatch 66 which may also have a cover (not shown). The cover 18 is necessary in some applications and must be tightly fitted and even fastened down in some applications. In other applications the cover 18 will be unnecessary or even undesirable.

FIG. 7 schematically shows an alternate embodiment of the system of FIG. 1 wherein the incoming slurry 100 is treated with a flocculating agent before being discharged into the hopper vessel 14. The flocculating system provides a treatment which increases the effective particle size of the slurry particulates, thereby improving both the sedimentation and the permeability of filter cakes and equipment such as described. The basic principal behind this largely chemical pretreatment is to neutralize the surface charges on particles, in order to reduce interparticle repulsion.

Mineral coagulants such as cationic, anionic, or ionic, electrolytes, alum and lime are used to produce particles up to one mm diameter. Flocculation agents, mostly synthetic polyelectrolytes of high molecular weight, are often used to agglomerate colloidal particles into giant, often interconnected flocs. Flocculating agents of this type have undergone rapid development over the past years and their use has improved the performance of many types of separation equipment. Because such agents are relatively expensive, the dosage is critical and must be optimized carefully.

A reservoir of flocculating agent polymer is shown at 88. The flocculent is passed through valve 96 into a metering pump 94, a check valve 98, a metering valve 90 and a conduit 102 into a mixing chamber 92. The chamber 92 is connected to receive the discharge of a slurry source 12 and successively discharges the slurry 100 into the hopper vessel 14. The mixer 92 serves to mix the flocculating agent polymer in with the slurry 100 such that the sedimentation reaction occurs in the hopper vessel 14. This arrangement is used for many sludges.

In operation as shown in FIGS. 1 and 2, the hopper vessel 14 is disposed to receive a slurry 100 from a slurry source 12. The slurry accumulates within the basket member 16 with the liquid contained in the slurry being allowed to drain through the filter media 26 and the perforated screen 24 into a drainage space provided between the filter cage 22 and the bottom 50 of the vessel 14.

As the liquid accumulates within the vessel 14, the pump 20 exerts a suction at the bottom of the vessel 14 through the conduit 64 and serves to remove the drained liquid as it accumulates.

At such time as the filtered solids accumulate to a prescribed volume within the filter cage 16, for example, 2½ or 3 cubic yards in the 3½ cubic yard capacity vessel 14, then the quick disconnect coupling 62 is disconnected from the vessel 14 and a fork lift transportation unit is moved in with the tines 33 of the unit fitted into the pockets of the base 30.

The vessel 14 is then picked up by the fork lift unit and transported to a site for discharge. At the dumping site, the latch 52 may be released to allow the vessel 14 to tip over and discharge the accumulated slurry solids down the discharge surface 27 of the basket of filter basket 16.

Alternately, the filter basket 16 may be lifted by the hoisting eyes 28 by suitable hoisting apparatus (not shown) out of the hopper vessel 14 and separately tilted over the discharge site to be emptied down the discharge surface 27. Thus some flexibility is provided. The entire assembly of container 14 and the filter basket 16 may be transported. Alternately, the transport basket 16 may be lifted out of the hopper vessel 14 and separately transported.

At the discharge site, (not shown) the hopper vessel 14 may be tilted to empty the filter cage 16, or the cage 16 may be separately lifted out of the filter vessel 14 and tilted to be emptied.

Also, alternately, the filter liner or media 26 may be lifted by suitable hoisting apparatus (not shown) out of the filter basket 16 and separately emptied and replaced in basket 16. In this instance the liner 26 may be immediately replaced with another liner 26, if desirable.

The flocculating equipment and process shown in FIG. 7 will be used at such time as the slurry 100 requires such flocculation in order to be properly settled out of the liquid in the hopper vessel 14.

It is to be understood that the invention as herein disclosed may be modified and tailored as necessary for best performance when utilized by those skilled in the art and without departing from the spirit of the invention as coming within the purview and scope of the appended claims.

I claim:

1. Portable apparatus for removing liquid from a liquid-solid slurry, comprising:
   (a) a transportable and tiltable receiving hopper vessel adapted to receive a liquid-solid slurry and adapted to be discharged when tilted;
   (b) a removable rigid screen cage frame conforming to the entire interior of said hopper vessel and providing flow passage for liquid flow from within said cage frame out through the sides and bottom of said cage frame to the bottom of said hopper vessel;
   (c) a flow screen attached to the interior of said cage frame and providing liquid flow through said flow screen into said flow passages;
   (d) said flow screen being comprised of rigid perforated plate adapted to structurally reinforce said screen cage framework;
   (e) a plurality of lifting eyes attached with the top of said cage frame to facilitate lifting said cage frame out of said hopper vessel;
   (f) a removable filter media conforming to the interior of said flow screen and being supported by said flow screen, wherein said removable filter media is constructed and arranged to allow said media and its contents to be lifted out of said flow screen and screen cage frame;
   (g) a flow passage permitting flow of liquid out from the bottom of said hopper vessel;
   (h) a moveable flow conduit connected through a quick-disconnect coupling means to said flow passage and also connected to a suction connection of a suction pump means; and
   (i) said suction pump means being a peristaltic pump.

2. The apparatus of claim 1 wherein said filter media is a material having porosity in the range of 1–1000 microns.

3. The apparatus of claim 2 wherein said hopper vessel is adapted to be attached to a lift transport apparatus and further includes releasable latch and trunnion means to permit tilting of said hopper vessel for dumping; and wherein said apparatus further includes flocculating means for introducing a flocculating agent into said liquid-solid slurry.

4. The apparatus of claim 1 wherein said apparatus further includes flocculating means for introducing a flocculating agent into said liquid-solid slurry.

5. The apparatus of claim 1 wherein said hopper vessel is adapted to be attached to a lift transport apparatus and further includes releasable latch and trunnion means to permit tilting of said hopper vessel for dumping.

6. The apparatus of claim 1 wherein said hopper vessel is adapted to be attached to a lift transport apparatus and further includes releasable latch and trunnion means to permit tilting of said hopper vessel for dumping; and wherein said apparatus further includes flocculating means for introducing a flocculating agent into said liquid-solid slurry.

* * * * *